United States Patent
Collins

3,934,148
Jan. 20, 1976

[54] FLUORESCENT PLASTIC CONTROLLED DIRECTION LAMP

[76] Inventor: William O. Collins, 6258 N. Kensington St., McLean, Va. 22101

[22] Filed: May 28, 1974

[21] Appl. No.: 474,078

[52] U.S. Cl.................. 250/458; 250/227; 350/96 R
[51] Int. Cl.².................. F21S 11/00; G02B 5/14
[58] Field of Search........... 350/96 R, 96 B, 96 WG; 250/227, 458–467, 483, 486, 487, 488, 361–369; 240/2.25, 1 EL; 40/130 C, 130 D, 130 E, 130 J, 130 K, 134; 331/94.5 P, 94.5 C; 252/301.2

[56] References Cited
UNITED STATES PATENTS

| | | | |
|---|---|---|---|
| 2,314,096 | 3/1943 | Leverenz | 350/96 R |
| 3,317,738 | 5/1967 | Piepenbrink et al. | 250/227 |
| 3,444,378 | 5/1969 | Cibula et al. | 350/96 R |
| 3,567,985 | 3/1971 | Goodman | 250/227 |
| 3,656,832 | 4/1972 | Judin | 350/96 B |
| 3,801,817 | 4/1974 | Goodman | 250/458 |

Primary Examiner—Ronald J. Stern
Assistant Examiner—Jon W. Henry
Attorney, Agent, or Firm—Clarence A. O'Brien; Harvey B. Jacobson

[57] ABSTRACT

A light distributing assembly such as a direction lamp utilizing a fluorescent plastic member which is capable of emitting light from its ends or edges when a light source is impinged on its surface combined with a cylindrical dowel, rod, spherical ball, reflector or the like which will pick up a substantial portion of the light emitted from the end or edge and direct such light in a restricted direction while concentrating the light into a beam capable of use in many orientations.

3 Claims, 10 Drawing Figures

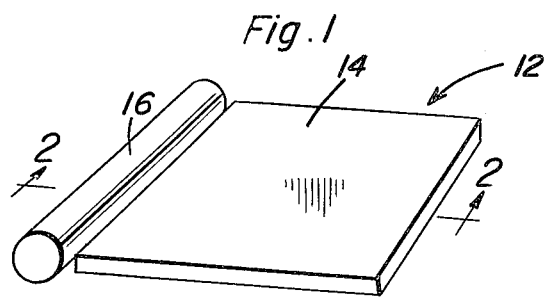
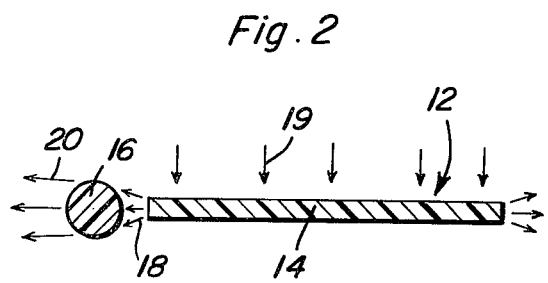
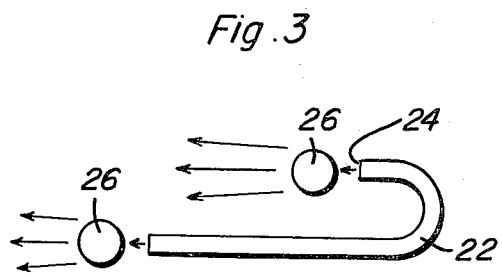
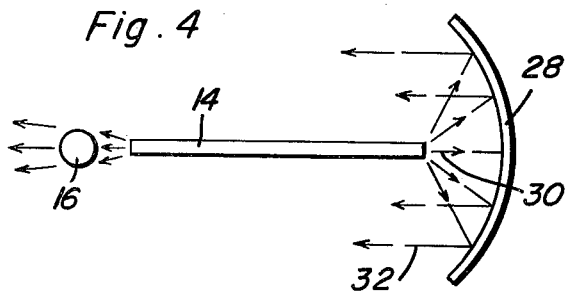
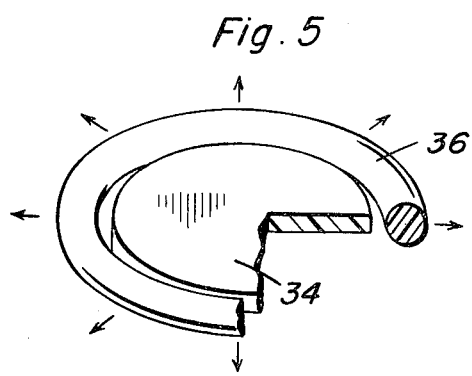
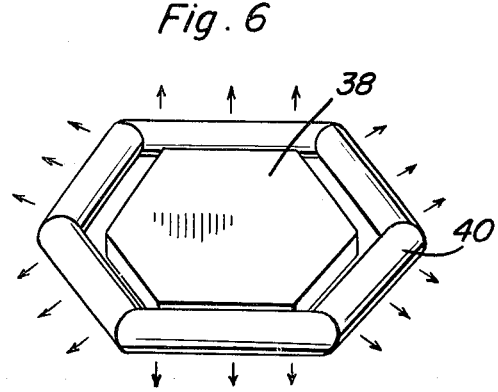
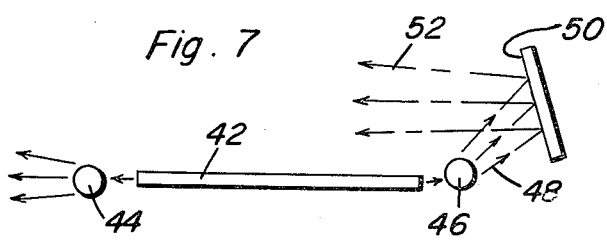
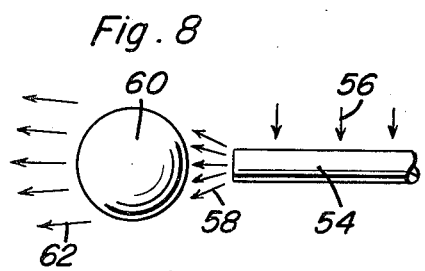
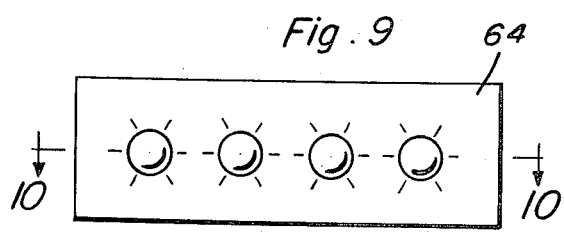
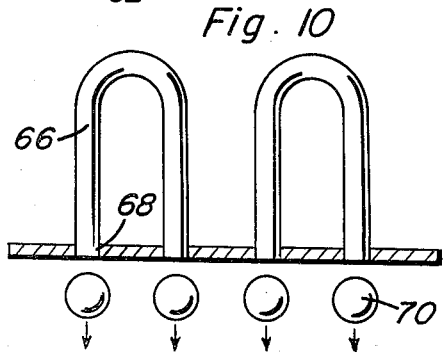

FLUORESCENT PLASTIC CONTROLLED DIRECTION LAMP

BACKGROUND OF THE INVENTION

1. Field of the Invention

The present invention generally relates to direction lamps, marker lights or other signal type devices in which a fluorescent plastic sheet is combined with cylindrical dowels, spheres, reflectors, other plastic sheets and the like for constructing various types of devices in which light emitted from an edge of a fluorescent plastic member is controlled for useful purposes.

2. Description of the Prior Art

The capability of fluorescent plastics emitting light from the edges when light is impinged upon the flat surfaces thereof is well known and is used for various practical purposes. Most practical uses of this technique involve observance of the light emitted from the edge of the fluorescent plastic sheet. For example, devices are known which utilize a source of light at one end of a rod or the like so that light will be emitted from the other end of the rod for illumination of inaccessible areas and the like. The following U.S. patents relate to this subject matter:

| | | |
|---|---|---|
| 3,131,670 | G. K. C. Hardesty | May 5, 1964 |
| 3,489,482 | H. A. Brill | Jan. 13, 1970 |
| 3,760,297 | G. H. B. Thompson | Sept. 18, 1973 |

SUMMARY OF THE INVENTION

An object of the present invention is to provide a combination of a fluorescent plastic sheet and a device for controlling and directing the edge emitted light from the fluorescent plastic sheet.

Another object of the invention is to provide a fluorescent plastic sheet or rod and a cylindrical dowel device, spherical ball device, curved reflector, straight reflector or other equivalent devices for controlling the light emitted from the edge of the fluorescent plastic sheet or end of the rod for utilization of such light in desired orientation and utility.

A further object of the invention is to provide a fluorescent plastic controlled direction lamp which utilizes commercially available components rendering the device relatively inexpensive to manufacture and capable of many and varied uses.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of one embodiment of the present invention utilizing a fluorescent plastic sheet and a cylindrical plastic dowel along one edge thereof.

FIG. 2 is a sectional view taken along section line 2—2 on FIG. 1 illustrating the manner in which light rays are emitted from the fluorescent plastic sheet and collected and directed by the dowel.

FIG. 3 is an elevational view of another embodiment of the invention in which the plastic sheet has one edge thereof reversely curved and with each edge of the plastic sheet being associated with a dowel.

FIG. 4 is a side elevational view of the construction of FIGS. 1 and 2 associated with a concave reflective surface.

FIG. 5 is a perspective view, with portions broken away illustrating a circular plastic sheet and an annular ring in the form of a continuous dowel.

FIG. 6 is a perspective view of an arrangement similar to FIG. 5 but illustrating the plastic sheet and encircling ring as polygonal in shape.

FIG. 7 is an elevational view of another embodiment of the invention in which a planar reflective surface is employed.

FIG. 8 is a fragmental elevational view illustrating a dowel provided with a spherical ball at one end thereof.

FIG. 9 is a front view of an assembly in which the construction of FIG. 8 is utilized in association with a panel or baffle.

FIG. 10 is a sectional view taken substantially upon a plane passing along section line 10—10 on FIG. 9 illustrating further associational relationship of the structure of the bent dowels and the spherical balls associated therewith.

DESCRIPTION OF THE PREFERRED EMBODIMENTS

The embodiments of the invention illustrated in FIGS. 1 and 2 is designated by reference numeral 12 and includes a sheet of fluorescent plastic material 14 disposed alongside of, in alignment with and spaced slightly from a cylindrical rod or dowel 16 of plastic or glass. The fluorescent plastic sheet 14 will emit light as indicated by the arrows 18 from each edge thereof when light impinges upon either flat surface thereof as indicated by the arrows 19. The dowel 16 picks up the emitted edge light and focuses the rays thereof so as to form a relatively narrow band of light with slight divergence as indicated by the arrows 20 in FIG. 2, with the angle of divergence of the arrows 18 being substantially greater than the angle of divergence of the arrows 20. Thus, the cylindrical rod or dowel generates a light beam that is relatively strong or brilliant since the light rays emitted from the edge of the plastic sheet are concentrated. The light rays impinging upon the fluorescent plastic sheet 14 may be daylight with the fluorescent plastic sheet 14 being an acrylic plastic such as "Plexiglas" fluorescent plastic, either colorless or of a transparent color with the edge light emitted from the fluorescent sheet being the color of the sheet itself. The dowel may be transparent, glass or plastic and of a diameter substantially greater than the thickness of the plastic sheet so that the edge light emitted from the sheet will be picked up and directed in a restricted but useful direction with the light energy being concentrated into a beam of useful configuration and direction. In tests, a 1 inch dowel used with a ⅛ inch sheet is quite successful and resulted in an 8° divergence of the final light beam. Generally, the higher the ratio of dowel diameter to sheet thickness, the narrower will be the angle of divergence of the final beam. This will hold true for the other embodiments of the invention.

FIG. 3 illustrates the same basic arrangement as FIG. 1 but in this construction, the fluorescent plastic sheet 22 is of U-shaped configuration with one leg thereof being longer than the other with each edge 24 being associated with a dowel or rod 26 so that the edge emitted light from the sheet 22 will be directed and concentrated by the rods or dowels 26 as illustrated in FIG. 3.

FIG. 4 illustrates another embodiment of the invention in which the assembly of FIG. 2 has a concave reflector 28 associated with the edge of the sheet 14 opposite from the dowel 16 so that the edge emitted light rays 30 will be reflected as substantially parallel rays 32 which have little divergence in relation to each other thus enabling both edges of the sheet 14 to be utilized with the light rays 30 from one edge being reflected by the reflector 28.

FIG. 5 illustrates a circular sheet 34 encircled by an annular rod or dowel 36 in spaced concentric relation thereto whereby the edge light emitted from the plastic sheet 34 will be concentrated and directed by the annular dowel or rod 36. This same arrangement may be employed in a plastic sheet and rod which are semi-circular in configuration or any other suitable segment of a circle.

FIG. 6 illustrates a similar embodiment except that the fluorescent plastic sheet 38 is of polygonal construction and the encircling rod or dowel 40 is correspondingly shaped with the configuration being hexagonal, octagonal or any other suitable polygonal shape.

FIG. 7 illustrates an arrangement in which the fluorescent plastic sheet 42 is provided with a dowel 44 along one edge thereof in alignment therewith and a dowel 46 along the other edge thereof slightly spaced above the axis of the plastic sheet 42 so that the light rays collected by the dowel 46 will be projected upwardly as at 48 with a slight degree of divergence for impingement upon a planar angulated reflective surface 50 so that the rays 52 are emitted therefrom at a slight angle of divergence.

FIG. 8 illustrates an arrangement in which a fluorescent plastic rod or dowel 54 has light impinging on the peripheral surface thereof as indicated by the arrows 56 thus emitting light 58 from the end thereof as indicated by numeral 58. A spherical ball 60 receives and collects the light rays 58 and concentrates them and discharges the light rays 62 on the opposite surface thereof with a slight angle of divergence with the ball 60 being a clear ball of glass, plastic or the like.

FIGS. 9 and 10 disclose an arrangement in which the structure of FIG. 8 is utilized and is associated with a baffle or panel 64 having a plurality of U-shaped rods or dowels 66 associated therewith and projecting through apertures 68 therein. Spherical balls 70 are oriented in closely spaced relation to the ends of the dowels thus emitting light rays therefrom. In this arrangement, the dowel being of fluorescent plastic will emit light from each end thereof. A clear ball of glass, fluorescent plastic or the like at the end of the dowel will project the end light as a fairly narrow conical beam of relatively intense light. To a viewer in line with the beam, the ball will appear completely filled with light when properly spaced from the end of the dowel.

An observer viewing any of the embodiments will see a light which appears to fill the entire cylinder or the entire ball thus providing an edge or end light which is considerably magnified in size. This device does not utilize electrical energy or the like and does not depend upon batteries, light bulbs or the like for actuation. Rather, daylight or sunlight is picked up by the flat or cylindrical surface and emitted from the edges or ends thereof. In both the flat sheet and the cylindrical rod, the light intensity emitted from the edge or end is directly proportional to light intensity impinging on the member and the surface area receiving the incident light. Thus, for a given diameter fluorescent plastic cylinder, the end light increases with increased length of the dowel.

In the fluorescent plastic dowel arrangement, a transparent glass or plastic ball is centered on the axis of the dowel and spaced a slight distance from the end of the dowel so that the light emitted from the dowel end is practically all passed into and through the ball which is of substantially larger diameter than the diameter of the dowel. The light emerges from the ball as a relatively narrow and bright beam of light of conical shape. This is especially useful where the view of the lamp is to be restricted to a limited direction as in aiming down a straight road where any light shining on areas to the side of the road would be wasted. Thus, the control provided by the dowel-ball combination provides maximum efficiency of use of the light available. The ball could be a half ball or lens of particular design with the resulting beam varying somewhat according to the geometry of the resulting optical system. The use of such shapes as described renders the assembly relatively inexpensive inasmuch as these shapes are standard manufactured shapes and are readily available.

Although the cylindrical rod used with the fluorescent plastic sheet embodiment of the invention is usually colorless and transparent, it may be colored providing the color is compatible with the color of the edge light emitted. For example, a red rod could be used with plastic sheets of a similar color or a color in the red spectrum such as orange, yellow, magenta or the like. Similarly, a red ball may be used with similar edge light colors emitted from the fluorescent dowel arrangement.

A lamp device incorporating the present invention may be used in various installations, especially outdoors from dawn to dusk. For example, the lamp may be used as an emergency light, directed down the roadway toward an oncoming vehicle to warn the operator of the oncoming vehicle of a disabled vehicle or the like, to warn motorists and identify road construction, hazards and the like, and to identify and make conspicuous various vehicles, especially motorcycles, bicycles and the like thus enhancing the safe operation of such vehicles. Additionally, the lamp may be used to quite conspicuously identify airport features such as runway outlines, visual approach slope indicators, edges of taxi-ways, ramps and the like and also provide daylight warning and identifying obstruction lights for hazards defined such as poles, antennas and various tall structures. The device may be used for signs, beacons, signals or other various attention attracting arrangements and for marking various items for directing attention thereto or enabling observation thereof. Additional uses of the invention include the construction of markers for trains, boats, vehicles of various types, sporting uses such as golf hole markers, football goal post outlines, baseball foul lines, identification of fire and emergency alarm locators, lighted wands for use by traffic policemen, use on channel markers or buoys and many other similar uses where observation or warning is a significant factor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A controlled light distributing unit comprising a fluorescent plastic member having a terminal light emitting surface emitting light therefrom in response to sunlight impinging upon a surface with the sunlight impinging surface being larger than the terminal light emitting surface, and a transparent, light collecting and distributing member having a curved surface in spaced, adjacent and aligned relation to the terminal light emitting surface of the fluorescent plastic member for receiving light emitted therefrom and a curved surface opposite from the terminal light emitting surface for emitting the received light therefrom, said fluorescent plastic member being a substantially flat circular sheet with the peripheral edge thereof defining the terminal light emitting surface, said light collecting and distributing member being an annular ring having a circular cross section disposed in adjacent spaced aligned concentric relation with the peripheral edge of the circular sheet and receiving light therefrom.

2. A controlled light distributing unit comprising a fluorescent plastic member having a terminal light emitting surface emitting light therefrom in response to sunlight impinging upon a surface with the sunlight impinging surface being larger than the terminal light emitting surface, and a transparent, light collecting and distributing member having a curved surface in spaced, adjacent and aligned relation to the terminal light emitting surface of the fluorescent plastic member for receiving light emitted therefrom and a curved surface opposite from the terminal light emitting surface for emitting the received light therefrom, said fluorescent plastic member being a substantially flat polygonal sheet with the peripheral edge thereof forming the terminal light emitting surface, said light collecting and distributing member being a continuous ring disposed in adjacent spaced aligned concentric relation with the peripheral edge of the polygonal sheet and receiving light therefrom.

3. A controlled light distributing unit comprising a fluorescent plastic member having a terminal light emitting surface emitting light therefrom in response to sunlight impinging upon a surface with the sunlight impinging surface being larger than the terminal light emitting surface, and a transparent, light collecting and distributing member having a curved surface in spaced, adjacent and aligned relation to the terminal light emitting surface of the fluorescent plastic member for receiving light emitted therefrom and a curved surface opposite from the terminal light emitting surface for emitting the received light therefrom, said fluorescent plastic member being a flat sheet defined by parallel unequal length leg portions connected by a curved bight portion with the edges of the member facing in the same direction defining terminal light emitting edges, said light collecting and distributing member being a pair of equal diameter cylindrical rods disposed in spaced parallel relation to the terminal light emitting edges of the fluorescent plastic sheet and receiving light therefrom.

* * * * *